United States Patent
Tanaka et al.

(10) Patent No.: US 6,206,814 B1
(45) Date of Patent: Mar. 27, 2001

(54) COMPOSITE WORK ROLL FOR COLD ROLLING

(75) Inventors: Taku Tanaka; Seiji Otomo; Masatoshi Ayagaki; Mitsuo Hashimoto; Katsutoshi Hokimoto; Akira Itoh, all of Kitakyushu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/194,986

(22) PCT Filed: Apr. 7, 1998

(86) PCT No.: PCT/JP98/01595

§ 371 Date: Dec. 7, 1998

§ 102(e) Date: Dec. 7, 1998

(87) PCT Pub. No.: WO98/45493

PCT Pub. Date: Oct. 15, 1998

(30) Foreign Application Priority Data

Apr. 8, 1997 (JP) .................................................... 9-088979
Mar. 17, 1998 (JP) ................................................. 10-066421

(51) Int. Cl.⁷ .................................................... F16C 13/00
(52) U.S. Cl. ............................................. 492/58; 148/541
(58) Field of Search ................................. 492/58, 16, 28; 148/541, 542, 543, 320, 334; 428/683, 684

(56) References Cited

U.S. PATENT DOCUMENTS

| 5,225,007 | * | 7/1993 | Hattori et al. | 492/58 |
| 5,514,065 | * | 5/1996 | Noda et al. | 492/58 |

FOREIGN PATENT DOCUMENTS

| 44-4903 | 3/1967 | (JP) . |
| 61-11310 | 3/1982 | (JP) . |
| 61-26758 | 2/1986 | (JP) . |
| 7-68588 | 5/1991 | (JP) . |
| 4-141553 | 5/1992 | (JP) . |
| 4-220105 | 8/1992 | (JP) . |
| 5-169112 | 7/1993 | (JP) . |

OTHER PUBLICATIONS

Patent Abstracts of Japan, vol. 014, No. 211 (C–0715), May 2, 1990 (May 2, 1990) & JP 02 047241 A (Nippon Steel Corp), Feb. 16, 1990 (Feb. 16, 1990).
Patent Abstracts of Japan, vol. 012, No. 358 (C–531), Sep. 26, 1988 (Sep. 26, 1988) & JP 63 114937 A (Kubota Ltd.), May 19, 1988 (May 19, 1988).
Patent Abstracts of Japan, vol. 008, No. 251 (C 252), Nov. 16, 1984 (Nov. 16, 1984) & JP 59 129757 A (Kubota Tekko KK), Jul. 26, 1984 (Jul. 16, 1984).
Patent Abstracts of Japan, vol. 1995, No. 08, Sep. 29, 1995 (Sep. 29, 1985) & JP 07 126795 A (Yodogawa Steel Works Ltd), May 16, 1995 (May 16, 1995).
Patent Abstracts of Japan, vol. 018, No. 468 (C–1244), Aug. 31, 1994 (Aug. 31, 1994), & JP 06 145888 A (Hitachi Metals Ltd.), May 27, 1994 (May 27, 1994).

* cited by examiner

*Primary Examiner*—I Cuda Rosenbaum
*Assistant Examiner*—Marc W. Butler
(74) *Attorney, Agent, or Firm*—Kenyon & Kenyon

(57) ABSTRACT

The present invention provides a cold rolling composite work roll with an outer layer having excellent high abrasion resistance and spalling resistance. The outer layer of the cold rolling composite work roll comprises; 0.9–1.5 wt % C, 0.3–1.0 wt % Si, 0.3–1.0 wt % Mn, 4.0–10.0 wt % Cr, 2.0–8.0 wt % Mo, 0.5–5.0 wt % V, and the remainder Fe and unavoidable impurities. A cold rolling composite work roll with high abrasion resistance has an outer layer with the above-mentioned composition wherein Mo is 3.0–8.0 wt %, formed by a continuous process for cladding around the perimeter of a core material made from ingot steel or forged steel. A cold rolling composite work roll with excellent spalling resistance has the above-mentioned composition wherein the surface portion of the outer layer formed by the continuous pouring process for cladding has a compression residual stress of 60 kgf/mm² or lower and a Shore hardness of HS 90 or greater.

6 Claims, 4 Drawing Sheets

WHITE PORTION
(EUTECTIC CARBIDE)

CRYSTAL GRAIN SIZE

Fig.1A
Fig.1B
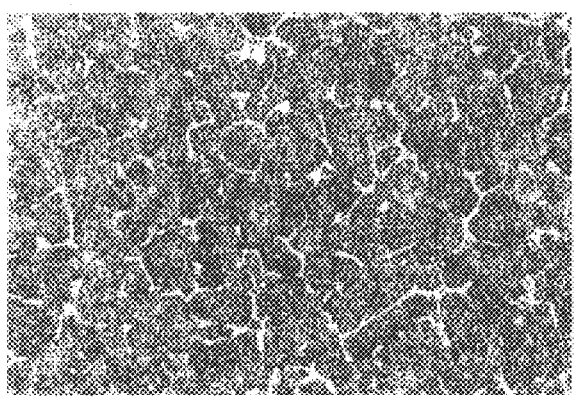
WHITE PORTION
(EUTECTIC CARBIDE)
CRYSTAL GRAIN SIZE

COMPOSITE WORK ROLL FOR COLD ROLLING

TECHNICAL FIELD

The present invention relates to a composite work roll used for cold rolling of steel, which is endowed with excellent spalling resistance (breakage resistance) and high abrasion resistance.

BACKGROUND ART

Steel cold (rolling) work rolls have conventionally employed forged steel containing 5–7 wt % Cr. Recent years have seen greater application of so-called semi high-speed steel work rolls containing small amounts of Mo, V, W, etc., such as the work rolls disclosed in Japanese Examined Patent Publication No. 61-11310 and Japanese Examined Patent Publication No. 7-68588.

Such conventional cold (rolling) work rolls are subjected to complex processes involving formation of a steel ingot by electro-slag remelting, followed by quenching and tempering through a forging step. During heat treatment, severe quenching by rapid cooling from high temperature is effected using techniques such as progressive induction heating and water quenching, in order to ensure a high hardness of HS 90 or greater. Electro-slag remelting which has conventionally been applied as a method of forged cold (rolling) work rolls gives a slow solidifying rate, so that the crystal grains or carbides tend to be coarse. Because of quenching cracks which occur during quenching when the crystal grains or carbides are coarse, a prior forging step has been essential to ensure sufficient material strength and ductility. From the standpoint of component design, it has been necessary for the C content to be kept to about 0.9 wt %, and all alloys such as Mo, V and W to be restricted. For these reasons, there has been a limit to the improvement in abrasion resistance of such work rolls.

It is known that roll surface hardness is greatly affected by the compression residual stress of the roll surface. For example, in order to ensure a high hardness it has been proposed to purposely provide a high residual stress, such as indicated in Japanese Unexamined Patent Publication No. 5-169112. Also, since the structure of conventional work rolls is an integral one wherein the roll and axis portions consist of the same component system, the internal material strength of the roll body is very high. As a result, the compression residual stress of roll body portions has been at a very high level of 70 kgf/mm$^2$ or greater. It is therefore common for severe spalling to occur from defects in the roll interior or cracks produced on the roll surface during rolling, so that improvements in breakage resistance, or spalling resistance, have been desired.

DISCLOSURE OF THE INVENTION

It is one of the objects of the present invention to provide a roll outer layer for cold rolling composite work rolls endowed with excellent abrasion resistance and spalling resistance. Specifically, this object is achieved by means of an outer layer formed around the perimeter of a core material for the cold rolling composite work roll, the cold rolling composite work roll outer layer being characterized by comprising; C: 0.9–1.5 wt %, Si: 0.3–1.0 wt %, Mn: 0.3–1.0 wt %, Cr: 4.0–10.0 wt %, Mo: 2.0–8.0 wt %, V: 0.5–5.0 wt % and the remainder Fe and unavoidable impurities.

It is another object of the invention to ensure excellent abrasion resistance by achieving a finer roll structure through an increased solidifying rate, and realizing high alloy steel which has not been possible by the prior art. Integral work rolls themselves require large steel ingots, making it very difficult to ensure a high solidifying rate. According to the invention, therefore, the work roll is given the composite structure of a roll core material and a roll outer layer so that the molten metal volume can be reduced to facilitate a higher solidifying rate. In other words, the highly abrasive resistant cold rolling composite work roll of the invention is characterized by being a cold rolling composite work roll with an outer layer formed around the perimeter of a core material, wherein the outer layer comprising; C: 0.9–1.5 wt %, Si: 0.3–1.0 wt %, Mn: 0.3–1.0 wt %, Cr: 4.0–10.0 wt %, Mo: 3.0–8.0 wt %, V: 0.5–5.0 wt % and the remainder Fe and unavoidable impurities, is formed around the perimeter of the core material made of cast steel or forged steel by a continuous pouring process for cladding, in order to provide high abrasion resistance.

It is a further object of the invention to provide a means for producing a cold rolling composite work roll with a low compression residual stress of 60 kgf/mm$^2$ or lower and a Shore hardness of HS 90 or greater, and with excellent spalling resistance, by forming a composite structure wherein low alloy steel with low yield strength is used as the work roll core material, and the components of the work roll outer layer are restricted so that the hardness is not impaired even with high temperature tempering at 500° C. and above. In other words, the cold rolling composite work roll with excellent spalling resistance according to the invention is characterized by being a cold rolling composite work roll endowed with excellent spalling resistance and having an outer layer formed around the perimeter of a core material, wherein the outer layer is formed around the perimeter of the core material by a continuous pouring process for cladding, the core is a low alloy steel comprising; at least 0.3–0.7 wt % C, 0.5–3.0 wt % Cr and 0.1–2.0 wt % Mo, the outer layer comprises C: 0.9–1.5 wt %, Si: 0.3–1.0 wt %, Mn: 0.3–1.0 wt %, Cr: 4.0–10.0 wt %, Mo: 2.0–8.0 wt %, V: 0.5–5.0 wt % and the remainder Fe and unavoidable impurities, and the surface portion of the outer layer has a compression residual stress of 60 kgf/mm$^2$ or lower and a Shore hardness of HS 90 or greater. The cold rolling composite work roll with excellent spalling resistance according to the invention has a high C content as well as a large amount of Mo useful for secondary hardening, in order to allow tempering at high temperatures of 500° C. and above. Steel ingots obtained by conventional electro-slag remelting have had coarse carbides which are a cause of quenching cracks which occur during quenching, and therefore the upper limit for the C content has been 1 wt %, while the Mo content has been limited to 2 wt % at the most. According to the invention, however, application of the continuous pouring process for cladding produces a finer structure, and makes possible high alloying while preventing formation of coarse carbides.

Furthermore, the outer layer of the cold rolling composite work roll with high abrasion resistance or spalling resistance according to the invention may also contain Ni at 5 wt % or less. The outer layer is also characterized by being composed of $M_6C$-based network eutectic carbide, granular MC carbide, tempered martensite and retained austenite, and by having a hardness of HS 90 or greater. In addition, the area ratio of the network eutectic carbide is at least 3 wt %. The crystal grain size of the outer layer is not greater than 150 μm.

BRIEF DESCRIPTION OF THE DRAWINGS

FIG. 1A is a microscope photograph (100× magnification) of an outer layer structure according to the invention. FIG.

1B is an illustration of how the crystal grain size is defined according to the invention.

Figure 2:
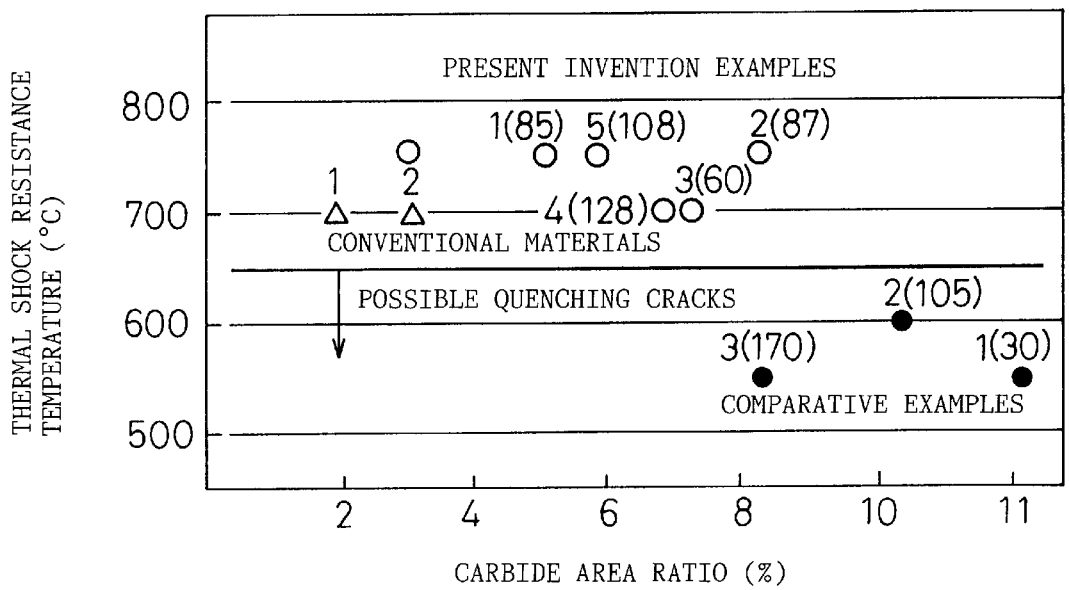

FIG. 2 is a graph showing the relationship between the eutectic carbide area ratio, thermal shock resistance temperature and crystal grain size, for examples according to the invention (○), comparative examples (●) and prior art materials (Δ).

Figure 3:
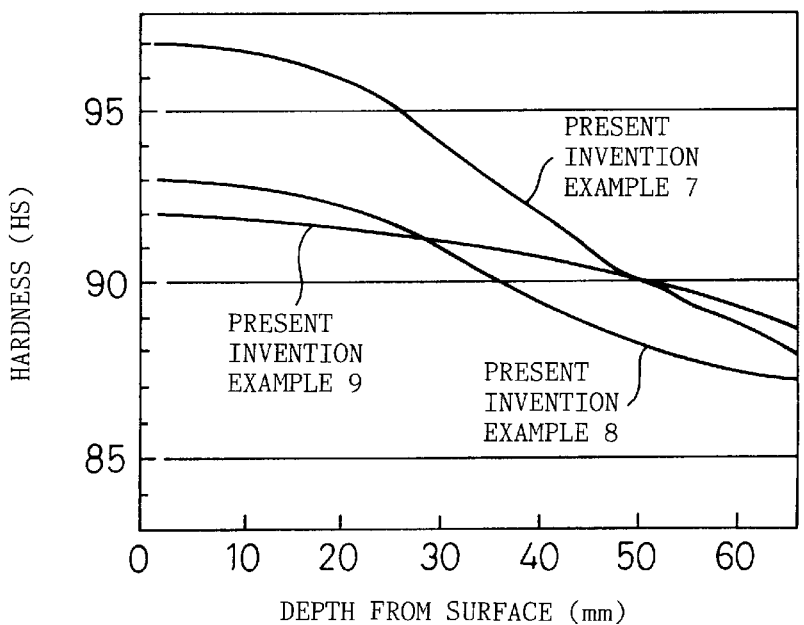

FIG. 3 is a graph showing the hardness depth of a roll according to an example of the invention.

Figure 4:
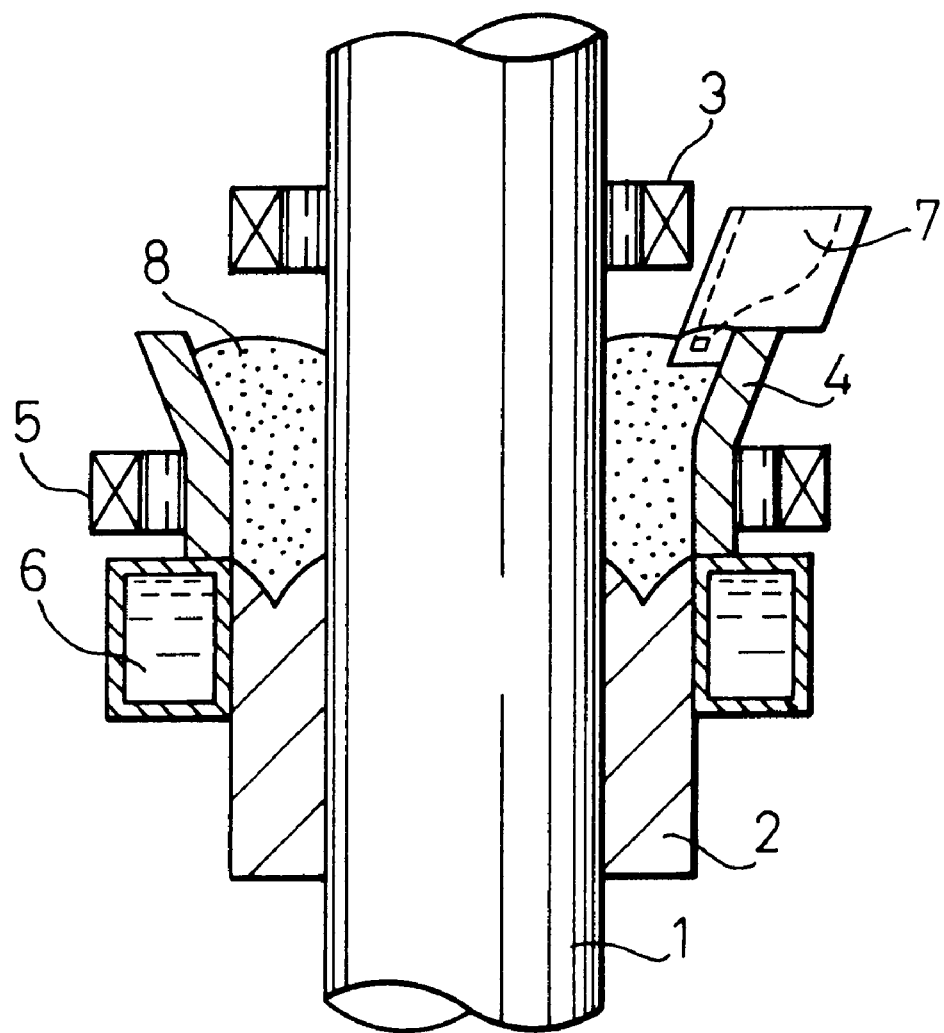

FIG. 4 is a sketch illustrating the continuous pouring process for cladding according to the invention.

Figure 5:
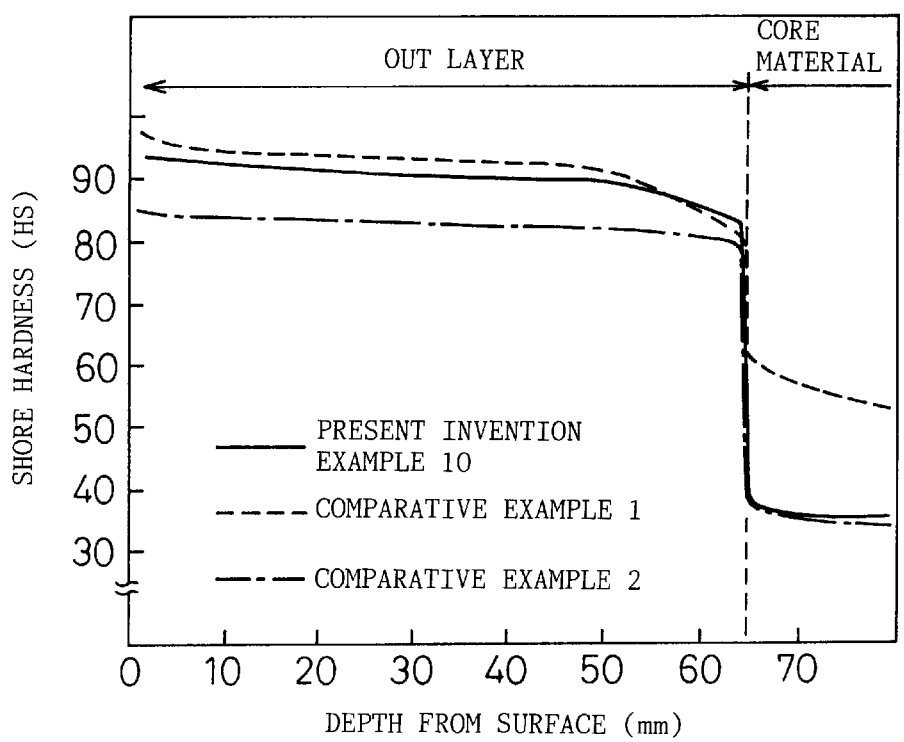

FIG. 5 is a graph showing the cross-sectional hardness distribution for rolls according to an example of the present invention and comparative examples.

Figure 6:
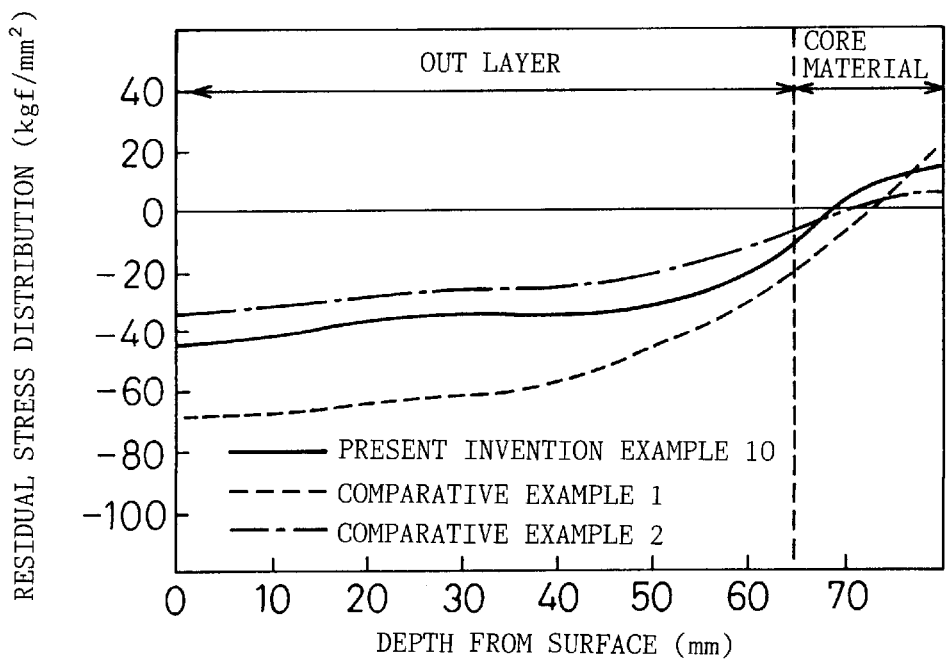

FIG. 6 is a graph showing the cross-sectional residual stress distribution for rolls according to an example of the present invention and comparative examples.

BEST MODE FOR CARRYING OUT THE INVENTION

The cold rolling composite work roll of the present invention is designed to have a high solidifying rate for a finer roll structure and realization of high alloying which has not been possible by the prior art, to thus ensure excellent abrasion resistance. The invention easily achieves a high solidifying rate by means of a composite structure of a core material and a outer layer for the work roll. The cold work roll of the invention has a composite structure wherein low alloy steel with low yield strength is used as the work roll core material, and the components of the work roll outer layer are restricted so that the hardness is not impaired even with high temperature tempering at 500° C. and above, whereby it is possible to provide a cold work roll with excellent spalling resistance, having a compression residual stress of 60 kgf/mm$^2$ or lower and a Shore hardness of HS 90 or greater.

The reason for restricting the components of the outer layer will now be explained.

C is an important element for achieving hardness. If the C content is less than 0.9 wt % there will not be enough C in solid solution in the base, making it impossible to achieve sufficient matrix hardness, and complicating efforts for high alloying. However, a C content exceeding 1.5 wt % will result in coarse carbides and lower strength, and therefore 1.5 wt % is established as the upper limit for the C content. A particularly preferred range for the C content is 1.0 wt % to 1.3 wt %.

Si is an essential element as a deoxidizing agent, and while an Si content of at least 0.3 wt % is necessary for it to exhibit its effect, it is preferably not greater than 1 wt % to avoid brittleness.

Similar to Si, Mn is also an essential element as a deoxidizing agent, and while an Mn content of at least 0.3 wt % is necessary for it to exhibit its effect, it is preferably not greater than 1 wt % to avoid brittleness.

Cr readily binds with C to form $M_7C_3$-based carbides, and it is an essential element for ensuring abrasion resistance and spalling resistance. If the Cr content is too low, however, sufficient abrasion resistance and spalling resistance cannot be ensured, while if the Cr content is too much there will be a tendency to develop a network of coarse carbides, thus lowering the toughness. An suitable range for the Cr content is from 4 wt % to 10 wt %.

Mo is an element which gives hard carbides, and which is a major contributor to secondary hardening when tempering at high temperatures. If the Mo content is less than 2 wt % its carbide deposit will be inadequate. If the Mo content exceeds 8 wt %, however, the carbide will be network but coarse. The suitable range for the Mo content was therefore determined to be from 2 wt % to 8 wt %. A Mo content of at least 2 wt % is also necessary to prevent spalling and ensure abrasion resistance. The Mo content is more preferably at least 3 wt % to further ensure abrasion resistance. A particularly preferred range for the Mo content is from 4 wt % to 6 wt %.

V is the element most responsible for the abrasion resistance and spalling resistance, because it forms MC carbides which have very high hardness. If the V content is less than 0.5 wt % its effect will be reduced, and if the V content exceeds than 5 wt % the grinding property will be impaired; the range for the V content was therefore determined to be from 0.5 wt % to 5 wt %. When photoluminescence is required for the outer layer surface of the roll, the V content is preferably kept up to 2 wt % from the standpoint of the grinding property.

Ni has the effect of improving the quenching property. For large-diameter rolls and other cases which require a depth having a high hardness, the Ni may be added as required for the hardness depth. However, if the Ni content exceeds 5 wt % the retained austenite will in excess in the composition, making it impossible to achieve a high hardness of HS 90 or greater, and therefore the upper limit for the Ni content is 5 wt %.

W results in coarse carbides, and therefore the addition of W should be avoided for the present invention.

Si and Mn are essential elements, not only as deoxidizing agents but also from the standpoint of improving the fluidity of the molten metal, and they may be included in amounts such as commonly used for high-speed steel. Such amounts will not adversely influence the effect of the present invention, but their proper range is from 0.3 wt % to 1.0 wt % as mentioned above.

The component system of the roll outer layer according to the present invention is an alloy designed with a high C content and high degree of alloying in order to improve the abrasion resistance in comparison to conventional rolls, and in cases where the solidifying rate is low, the carbides may become coarse, resulting in cracking during the quenching. The composite structure is one effective means for ensuring a high solidifying rate. One preferred method as a means for manufacturing the composite roll whereby a particularly high solidifying rate may be achieved is the continuous pouring process cladding disclosed in Japanese Examined Patent Publication No. 44-4903. The continuous pouring process for cladding is a method wherein the molten metal is heated with a heating coil during its introduction in order to form an outer layer in the gaps between the steel core material and the annular cooling frame set up around it, and it is characterized in that the small solidification volume guarantees a high solidifying rate.

In order to ensure excellent abrasion resistance and avoid quenching cracks during heat treatment, the crystal grain size in the solidified structure is preferably not greater than 150 μm. This allows the forging step to be eliminated since the crystallizing carbides are also very fine. Incidentally, the crystal grain size mentioned here is the crystal grain size upon solidification, and it includes the regions surrounded by the carbides. The definition of the crystal grains is illustrated in FIG. 1B. The solidifying rate which can be achieved by the continuous pouring process for cladding is of course limited, and the maximum crystal grain size obtained at that rate is 30 μm; however, the crystal grain size and carbide size are preferred to be even smaller to avoid quenching cracks during heat treatment.

The highly abrasion-resistant cold rolling composite work roll of the invention is also characterized in that the outer layer crystal structure is radically different from the crystal structure of conventional cold work rolls. This results from the presence of network $M_6C$-based eutectic carbides. It is already known that a larger carbide content gives better abrasion resistance and seizure resistance. However, it has been conventional to employ the strategy of limiting the C content or alloy content, or the strategy of segmentation or refining of the carbides by forging, in order to prevent crystallization of the network eutectic carbides during forging from the standpoint of ensuring resistance to quenching cracks which occurs during quenching with network eutectic carbides.

Another feature of the present invention is its improved spalling resistance due to a lower residual stress. Almost all cold work rolls manufactured by conventional electro-slag remelting methods have an integral structure. Attempts have been made to produce composite rolls using electro-slag remelting methods in which high strength materials are applied wherein the component system of the core material comprises at least 0.8% C and at least 3 wt % Cr, virtually identical to the outer layer. Application of such high yield strength materials as core materials has resulted in high residual stress.

Thus, according to the present invention a composite structure is used wherein the roll outer layer is formed by a continuous pouring process for cladding around a roll core material which is a low yield strength low-alloy steel with a composition of C: 0.3–0.7 wt %, Cr: 0.5–3.0 wt % and Mo: 0.1–2.0 wt %. The C content of the core material is preferably no greater than 0.7 wt %. It is more preferable for the C content of the core material to be limited to no greater than 0.5 wt % to achieve a residual stress of 45 kgf/mm². On the other hand, it is not preferred for the C content to be under 0.3 wt % as a strength of at least 30 kgf/mm² is desired for the roll core material.

FIG. 4 is a sketch illustrating the continuous pouring process for cladding according to the invention. As shown in FIG. 4, a water-cooling mold 6 is set around the perimeter of a vertically standing core material 1, molten metal 8 which is to form the outer layer 2 is introduced into the gap while heating with a heating coil 5, and the core material is pulled downward in a continuous manner as solidification proceeds with a gradual deposit onto the core material 1, thereby cladding a composite roll. Numeral 3 is a preheating coil, 4 is a refractory frame, 6 is a water cooling mold and 7 is a nozzle.

After cladding, the composite work roll is immediately subjected to annealing, rough machining and tempering treatment, and then progressive induction heating and water quenching is carried out and followed by tempering at 500–600° C., giving a roll having a roll surface with a residual compression stress of no greater than 60 kgf/mm². According to the present invention it becomes possible to carry out high temperature tempering at 500–600° C. by limiting the components of the outer layer. If the tempering temperature is under 500° C. the secondary hardening cannot be achieved, making it impossible to ensure a Shore hardness of 90 or greater. On the other hand, if the tempering temperature is higher than 600° C. the hardness will be drastically reduced. In order to ensure a Shore hardness of 92 or greater, the tempering temperature is preferably in the range of 500–540° C.

EXAMPLE 1

The following describes an example of a cold rolling composite work roll with high abrasion resistance. Sample ingot materials were prepared with the component systems listed in Table 1, and after normalization, a ϕ40 mm×100 mm test piece was cut off from each sample material and subjected to quenching and tempering. The thickness of the sand mold was adjusted during preparation of the ingot to alter the solidifying rate for preparation of samples with different grain sizes. Comparative Examples 1 and 2 are cases with C contents and alloy contents exceeding the component ranges according to the present invention, and Comparative Example 3 is a case where the crystal grain size is of a coarseness beyond the crystal grain size according to the present invention. Prior art materials 1 and 2 were sample materials taken from actual work rolls. Prior art materials 1 and 2 were prepared by electro-slag remelting methods, prior art material 1 being forged steel containing 5 wt % of Cr and prior art material 2 being semi-high-speed strength forged steel. Prior art material 1 was a component system with no crystallization of $M_6C$ eutectic carbides.

A thermal shock test and cold abrasion test were conducted for evaluation of the properties. The thermal shock test was carried out by heating for 30 minutes at a prescribed temperature, immediately dropping it in water for quenching, examining the presence of any generated cracks, and determining the maximum temperature at which no cracks were produced. The cold abrasion test was conducted using a Nishihara-model abrasion tester upon quenching of the sample after austenitizing at 900–1200° C. and tempering at 100–600° C. to ensure a hardness of HS 90 or greater.

The evaluation results are shown in Table 1 and FIG. 2. It can be seen that with the components and crystal grain size ranges according to the present invention, the higher C content and higher degree of alloying provided all of the samples of the present invention with more excellent abrasion resistance than the prior art materials. Despite the higher C content and higher degree of alloying of the materials of the present invention, they had thermal shock properties comparable to the prior art materials, and were able to withstand severe heat treatment even without forging. However, with an excessive C content or alloy content as in Comparative Examples 1 and 2, the carbides were coarser thus drastically lowering the thermal shock resistance and resulting in possible quenching cracks during the quenching step. In Comparative Example 3 it is seen that the shock resistance is lower even with a coarser structure.

EXAMPLE 2

The following is another example of a cold rolling composite work with high abrasion resistance. As the example of the present invention, an outer layer material made of the components listed in Table 2 was deposited around the perimeter of a core material of SCM440 by the continuous pouring process for cladding to prepare a sample cold rolling composite work roll with a body diameter of ϕ450 mm and a body length of 1500 mm.

This example included low-frequency progressive induction heating and water quenching, but eliminated the forging step. The quenching temperature range was 900–1200° C., and the tempering was carried out twice in a temperature range of 100–600° C.

The roll outer layers of this example had component designs with higher C contents and higher alloying than conventional roll materials, but all maintained high hardness without cracking damage even under severe heat treatment.

FIG. 3 shows the hardness distribution for the obtained rolls. The results for Example 9 shown in FIG. 3 indicate that addition of Ni is effective for improving hardness depth.

When these rolls according to examples of the present invention were used for actual cold rolling, they lasted over 3 times longer than the forged steel containing 5 wt % of Cr rolls of the prior art, and over 2 times longer than the semi-high-speed forged steel rolls, so that the exchange frequency of the rolls was drastically reduced.

EXAMPLE 3

The following is an example of a cold rolling composite work roll with high spalling resistance. As the example of the present invention, a rolled round bar having the components listed in Table 3 was used as the core material, and an outer layer material made of the components listed in Table 3 was deposited around its perimeter by the continuous pouring process for cladding to prepare a cold rolling composite work roll with a body diameter of φ550 mm, a body length of 1500 mm, and a total length of 3500 mm. High-alloy steel was used as the core material in Comparative Example 4 and an outer layer component range outside of the range of the present invention was used for Comparative Example 5, while both were prepared by the same continuous pouring process for cladding method. The outer layer and core material components for each are listed in Table 3.

After cladding, each sample was subjected to annealing, rough machining and then tempering treatment for carbide segmentation. Quenching was then carried out by progressive induction heating and water quenching. The quenching was accomplished at a surface temperature of 950–1100° C., and tempering was carried out 3 times at 500–540° C.

The cross-sectional hardness distribution for the present invention examples and comparative examples are shown in FIG. 5, and the residual stress distribution for the present invention examples and comparative examples are shown in FIG. 6. As seen in FIG. 5, a Shore hardness of 90 or greater was obtained up to a depth of 50 mm from the surface in Example 10 of the invention, while the residual stress was 43.8 kgf/mm$^2$, which was a much lower level than the residual stress level of the prior art, and would be expected to provide resistance to spalling. In Comparative Example 5, which employed high-alloy steel as the core material, the residual stress was 68.0 kgf/mm$^2$ which was equivalent to the high residual stress of the conventional integral roll. Also, upon applying high-temperature tempering of over 500° C. in Comparative Example 5 in which the Mo content of the outer layer was outside of the range of the invention, no secondary hardening effect was obtained, and a Shore hardness of 90 or greater could not be achieved.

TABLE 1

| | | Composition (wt %) | | | | | | Thermal shock resistance temp. (° C.) | Relative abrasion | Crystal grain size (μm) | Carbide area ratio (%) | Forging |
|---|---|---|---|---|---|---|---|---|---|---|---|---|
| | | C | Si | Mn | Cr | Mo | V | Ni | | | | |
| Present Invention Example | 1 | 1.0 | 0.8 | 0.6 | 4.2 | 6.1 | 0.5 | — | 750 | 27 | 85 | 5.3 | — |
| | 2 | 1.2 | 0.8 | 0.5 | 9.0 | 4.5 | 2.0 | — | 750 | 24 | 87 | 8.2 | |
| | 3 | 1.5 | 0.6 | 0.5 | 4.5 | 3.0 | 4.3 | — | 700 | 10 | 60 | 7.4 | — |
| | 4 | 1.4 | 0.6 | 0.5 | 4.0 | 8.0 | 1.5 | — | 700 | 20 | 128 | 7.1 | — |
| | 5 | 1.1 | 0.8 | 0.7 | 5.2 | 4.8 | 1.1 | 2.0 | 750 | 25 | 108 | 5.9 | — |
| | 6 | 0.94 | 0.7 | 0.5 | 5.5 | 4.2 | 1.1 | — | 750 | 28 | 92 | 3.2 | — |
| Comp. Example | 1 | 1.6 | 0.6 | 0.5 | 11.7 | 7.0 | 1.5 | — | 700 | 20 | 90 | 7.1 | — |
| | 2 | 1.5 | 0.6 | 0.8 | 9.4 | 8.3 | 2.4 | — | 600 | 24 | 105 | 10.4 | — |
| | 3 | 1.4 | 0.8 | 0.4 | 6.2 | 7.3 | 2.7 | — | 550 | 20 | 170 | 8.3 | — |
| Prior art material | 1 | 0.85 | 0.7 | 0.3 | 4.9 | 0.4 | — | — | 700 | 100 | — | 2.0 | yes |
| | 2 | 0.88 | 0.9 | 0.8 | 4.8 | 1.8 | 1.0 | — | 700 | 37 | 300 | 3.2 | yes |

TABLE 2

| | Composition | | | | | | | Crystal grain size (μm) | Carbide area ratio (%) |
|---|---|---|---|---|---|---|---|---|---|
| | C | Si | Mn | Cr | Mo | V | Ni | | |
| Present Invention Example 7 | 1.1 | 0.6 | 0.6 | 5.0 | 4.0 | 1.2 | — | 87 | 6.4 |
| Present Invention Example 8 | 1.2 | 0.7 | 0.4 | 7.0 | 4.2 | 1.1 | — | 82 | 6.9 |
| Present Invention Example 9 | 1.2 | 0.7 | 0.4 | 5.5 | 6.0 | 1.0 | 3.0 | 87 | 6.4 |

TABLE 3

| | | C | Si | Mn | Cr | Mo | V |
|---|---|---|---|---|---|---|---|
| Present Invention Example 10 | Outer layer material | 1.10 | 0.60 | 0.54 | 4.80 | 4.52 | 2.0 |
| | Core material | 0.43 | 0.29 | 0.83 | 1.13 | 0.23 | — |
| Comp. Ex. 4 | Outer layer material | 1.12 | 0.62 | 0.51 | 4.82 | 6.20 | 1.0 |
| | Core material | 0.94 | 0.66 | 0.70 | 3.05 | 0.20 | — |
| Comp. Ex. 5 | Outer layer material | 1.10 | 0.5 | 0.53 | 4.67 | 1.74 | 2.1 |
| | Core material | 0.43 | 0.28 | 0.84 | 1.14 | 0.23 | — |

Industrial Applicability

According to the present invention it is possible to provide cold work rolls having very excellent abrasion resistance, and achieve a reduction in roll exchange frequency and greater rolling efficiency.

The present invention also provides cold work rolls having low residual stress and very excellent spalling resistance, without reduced abrasion resistance, so that it is possible to achieve resistance to spalling originating from internal defects or roll surface cracks.

What is claimed is:

1. A cold rolling composite work roll outer layer formed around the perimeter of the core material of a cold rolling composite work roll, which is a roll outer layer characterized by comprising:

C: 0.9–1.5 wt %,
Si: 0.3–1.0 wt %,
Mn: 0.3–1.0 wt %,
Cr: 4.0–10.0 wt %
Mo: 2.0–8.0 wt %,
V: 0.5–5.0 wt % and the remainder Fe and unavoidable impurities;

said outer layer having a $M_6C$-based network eutectic carbide, granular MC carbide, tempered martensite and retained austenite, and has a hardness of HS 90 or greater.

2. A cold rolling composite work roll with an outer layer formed around the perimeter of a core material, which is a cold rolling composite work roll characterized by having high abrasion resistance, wherein said outer layer comprises;

C: 0.9–1.5 wt %,
Si: 0.3–1.0 wt %,
Mn: 0.3–1.0 wt %,
Cr: 4.0–10.0 wt %
Mo: 2.0–8.0 wt %,
V: 0.5–5.0 wt %, and the remainder Fe and unavoidable impurities, is formed by a continuous pouring process for cladding around the perimeter of said core material which is made from cast steel or forged steel;

said outer layer having a $M_6C$-based network eutectic carbide, granular MC carbide, tempered martensite and retained austenite, and has a hardness of HS 90 or greater.

3. A cold rolling composite work roll with an outer layer formed around the perimeter of a core material, which is a cold rolling composite work roll characterized by having excellent spalling resistance, wherein said outer layer is formed around the perimeter of said core material by a continuous pouring process for cladding, said core material is a low alloy steel comprising at least 0.3–0.7 wt % C, 0.5–3.0 wt % Cr and 0.1–2.0 wt % Mo, said outer layer comprises;
C: 0.9–1.5 wt %,
Si: 0.3–1.0 wt %,
Mn: 0.3–1.0 wt %,
Cr: 4.0–10.0 wt %,
Mo: 2.0–8.0 wt %,
V: 0.5–5.0 wt % and the remainder Fe and unavoidable impurities, the surface portion of said outer layer has a compression residual stress of 60 kgf/mm$^2$ or lower and a Shore hardness of HS 90 or greater, said outer layer having a $M_6C$-based network eutectic carbide, granular MC carbide, tempered martensite and retained austenite.

4. A cold rolling composite work load according to any one of claims 1 to 3, characterized in that said outer layer further contains Ni at not greater than 5 wt. %.

5. A cold rolling composite work roll according to any one of claims 1 to 3 characterized in that the area ratio of said network eutectic carbide is at least 3%.

6. A cold rolling composite work roll according to anyone of claims 1 to 3, characterized in that the crystal grain size of said outer layer is not greater than 150 μm.

* * * * *